(12) United States Patent
DuBose et al.

(10) Patent No.: US 9,273,475 B1
(45) Date of Patent: *Mar. 1, 2016

(54) CEMENT INDUSTRY GANGWAY

(71) Applicant: Aluminum Ladder Company, Florence, SC (US)

(72) Inventors: Adam Lewis DuBose, Hartsville, SC (US); Ronald Wayne Bennett, Florence, SC (US)

(73) Assignee: Sam Carbis Asset Management, LLC, Florence, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/911,237

(22) Filed: Jun. 6, 2013

Related U.S. Application Data

(62) Division of application No. 12/831,393, filed on Jul. 7, 2010, now Pat. No. 8,479,882.

(51) Int. Cl.
   *E04G 5/14* (2006.01)
   *E04G 1/18* (2006.01)
   *B60P 3/22* (2006.01)

(52) U.S. Cl.
   CPC . *E04G 1/18* (2013.01); *B60P 3/226* (2013.01); *E04G 5/14* (2013.01)

(58) Field of Classification Search
   CPC .............. B60P 3/226; E04G 1/18; E04G 5/14
   USPC ......................................................... 182/113
   See application file for complete search history.

(56) References Cited

U.S. PATENT DOCUMENTS

| | | | |
|---|---|---|---|
| 1,942,720 A * | 1/1934 | Mize | 49/205 |
| 2,155,544 A * | 4/1939 | Harlow | 43/61 |
| 2,544,207 A * | 3/1951 | Wilson | 5/136 |
| 2,798,652 A | 7/1957 | Easton | |
| 3,821,865 A | 7/1974 | Steinke | |
| 3,878,916 A * | 4/1975 | White, Jr. | 182/145 |
| 3,918,406 A | 11/1975 | Patterson | |
| 4,059,413 A * | 11/1977 | Forgione | 49/56 |
| 4,133,295 A | 1/1979 | Jones | |
| 4,572,328 A | 2/1986 | Benko | |
| 4,679,657 A | 7/1987 | Bennett et al. | |
| 4,989,918 A * | 2/1991 | Biddy | 298/23 MD |
| 5,042,612 A | 8/1991 | Bennett et al. | |
| 5,125,202 A | 6/1992 | Kissinger | |
| 5,511,257 A * | 4/1996 | Hannes | 5/100 |
| 5,624,127 A * | 4/1997 | Arreola et al. | 280/163 |
| 5,829,550 A * | 11/1998 | Cornish | 182/113 |
| 6,238,169 B1 * | 5/2001 | Dupuy et al. | 414/546 |
| 6,390,152 B1 | 5/2002 | Donovan et al. | |
| 6,405,831 B1 | 6/2002 | Daniel, III | |
| 6,923,140 B1 | 8/2005 | Cook | |
| 7,140,467 B2 | 11/2006 | Cook | |
| 7,216,741 B2 | 5/2007 | MacDonald et al. | |
| 7,861,463 B1 | 1/2011 | Nottage | |
| 8,015,647 B2 | 9/2011 | Bennett | |
| 2007/0125600 A1 | 6/2007 | Bennett | |

* cited by examiner

*Primary Examiner* — Alvin Chin-Shue
(74) *Attorney, Agent, or Firm* — Amy Allen Hinson; Nexsen Pruet, LLC

(57) ABSTRACT

A safety cage improves the safety of workers servicing tanker vehicles having top side hatches. A part or parts of the cage can be repositioned to permit the hatch cover to be opened and then can be returned to a safety enhancing position.

15 Claims, 8 Drawing Sheets

CEMENT INDUSTRY GANGWAY

CROSS-REFERENCE TO RELATED APPLICATIONS

This application is related to co-pending U.S. patent application Ser. No. 12/831,393 filed Jul. 7, 2010, which is incorporated herein by reference.

BACKGROUND

Loading tanks of transport trucks is a hazardous and dangerous task. To prepare the tank for loading, it is necessary for a worker to open the hatch or hatches on the upper surface of the tank. The upper surface of the tank is typically cylindrical and often slippery causing frequent slips and falls by workers. Further, the worker must access the top surface again after the tank is loaded to close the hatch or hatches on the tank. Because of these hazardous conditions, it is known in the art to use safety cages to protect the workman, such as the one disclosed in U.S. Pat. No. 7,216,741.

Most safety cages in the art are ineffective in providing fall protection for transport trucks such as dry bulk transport trucks. The typical standard operating procedure for loading dry bulk transport trucks is to open the hatch at one location, drive the truck to a loading station for loading, and then close the hatch at the second location or return the truck to the original or another location suitable for closing the hatch. The hatch cover is normally hinged on a horizontal axis extending in the longitudinal direction of the tank and truck. When the hatch cover is opened, it is desirable to pivot the hatch cover to a fully open position in which the top of the cover rests on the upper part of one lateral side of the tank. If the side railing of a safety cage is spaced laterally outward a sufficient distance to permit the hatch cover to be fully opened, the side railing is positioned too far laterally to prevent the worker from falling. It also may be too far away to be used by the worker as a grab bar to regain balance or to stop a fall. Conversely, if the side railing of a safety cage is spaced laterally inward a sufficient distance to prevent the worker from falling, the hatch cover is not permitted to be fully opened.

SUMMARY

The present invention includes an apparatus for providing safe access to the top of a mobile container having a hatch cover positioned at the top of the mobile container that pivots between an open and a closed position. In one embodiment of the invention, the apparatus includes a gangway capable of being raised and lowered and a cage having a first end attached to the gangway and an opposing second end. The cage may also include a first lateral side, a second lateral side, and a joining side for joining the first and second lateral sides at the opposing second end of the cage. The joining side may include a gate that is vertically slidably engaged with the joining side. The gangway or cage is typically attached to a service station platform for preparing the mobile container for loading.

In an alternative embodiment of the invention, the apparatus includes a gangway capable of being raised and lowered and a cage having an open bottom. The cage includes a first end attached to the gangway and an opposing second end. The cage may also include a first lateral side, a second lateral side, and a joining side for joining the first and second lateral sides at the opposing second end of the cage. Further, the cage may include a partial floor adjoining the first and second lateral sides at the first end wherein the partial floor is dimensioned to extend less than half the length of the first lateral side of the cage. The partial floor may pivot about an axis extending parallel with the first end of the cage.

The present invention also includes a method for providing safe access to a top of a mobile container having a hatch cover positioned at the top of the mobile container that pivots between an open and a closed position. In one embodiment of the invention, the method includes the steps of providing a gangway capable of being raised and lowered and providing a cage. The cage may have a first end attached to the gangway and an opposing second end wherein the cage includes a first lateral side, a second lateral side, and a joining side for joining the first and second lateral sides at the opposing second end of the cage. Further, the joining side may include a gate that is vertically slidably engaged with the joining side. The method further includes the steps of positioning the cage into engagement with the mobile container by lowering the gangway wherein the cage surrounds the hatch cover of the mobile container and sliding the gate in an upward direction to allow access for the hatch cover of the mobile container to be pivoted between an open and closed position.

In an alternative embodiment of the invention, the method includes the steps of providing a gangway capable of being raised and lowered and providing a cage. The cage may have a first end attached to the gangway and an opposing second end wherein the cage includes a first lateral side, a second lateral side, a joining side for joining the first and second lateral sides at the opposing second end of the cage, and a partial floor adjoining the first and second lateral sides at the first end of the cage. Further, the partial floor may pivot about an axis extending parallel with the first end of the cage. The method further includes the steps of positioning the cage into engagement with the mobile container by lowering the gangway wherein the cage surrounds the hatch cover of the mobile container and pivoting the partial floor about the axis in an upward direction to allow access for the hatch cover of the mobile container to be pivoted between an open and closed position.

DETAILED DESCRIPTION

The present invention is related to a safety cage and gangway that is particularly suitable for use when opening and closing the hatch of a tanker truck and in particular a dry bulk material tanker truck. Although primarily described herein in terms of its use with tank trucks and service station platforms, it will be clear that the present invention can also be used in connection with a variety of other mobile containers and service station configurations. The invention will be described with reference to the figures forming an integral non-limiting part of the instant specification. Throughout the description similar elements will be numbered accordingly.

Figure 1:
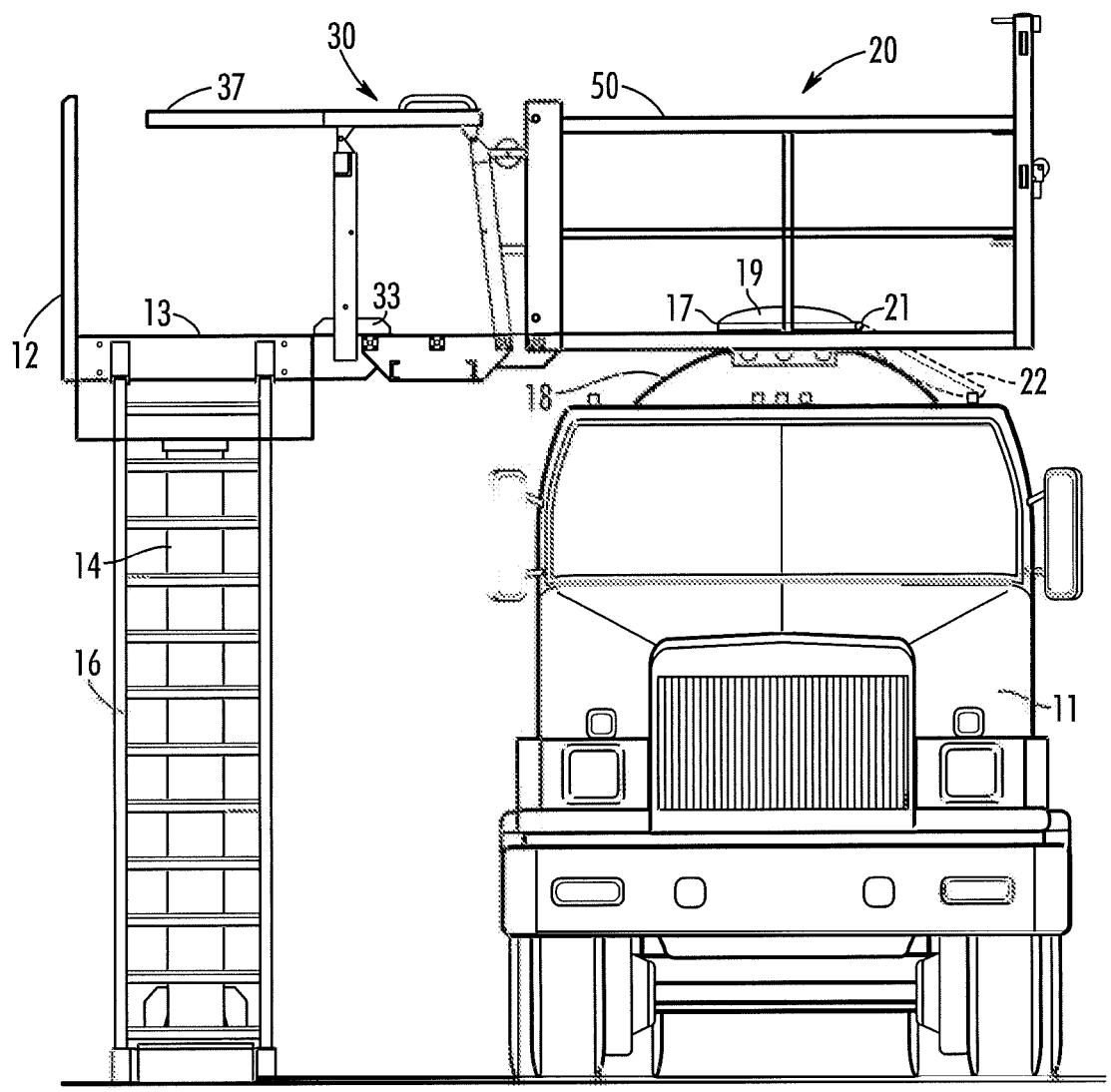
FIG. 1 is a front view of an access platform, the gangway and the safety cage positioned above the hatch of a dry bulk material tank mounted on a truck.

FIG. 1 illustrates a tanker vehicle in the form of a dry bulk material tank truck 11 positioned for servicing at a standard hatch opening and closing station that includes a worker access or service platform 12 with a floor 13, typically supported by one or more pillars 14, and a stairway or ladder 16. Typical dry bulk material handling tanker vehicles have a hatch 17 on the top of a tank 18 with a hatch cover 19 which is pivotally hinged to the hatch 17 on a horizontal axis 21 extending in the longitudinal direction of the vehicle, that is, in a fore and aft direction. The open position of the hatch cover is shown by broken lines 22.

Figure 3A:
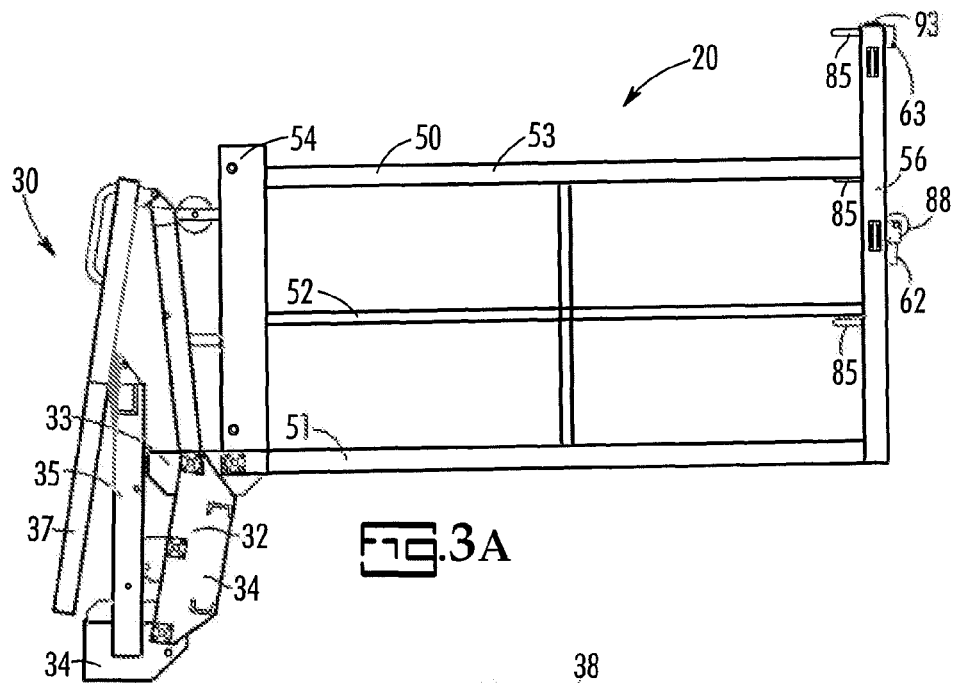
FIG. 3A is a side view of the safety cage and the gangway in the stored position.
Figure 3B:
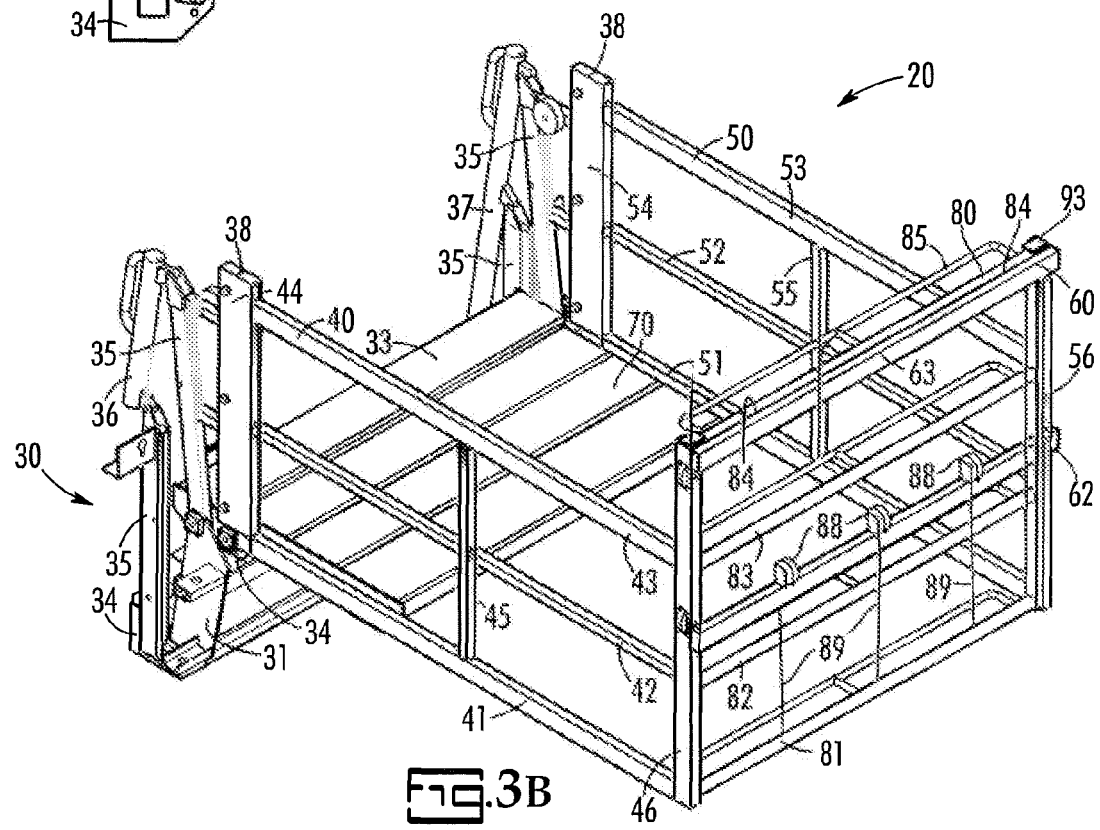
FIG. 3B is a perspective view of the safety cage and the gangway in the stored position.
Figure 4A:
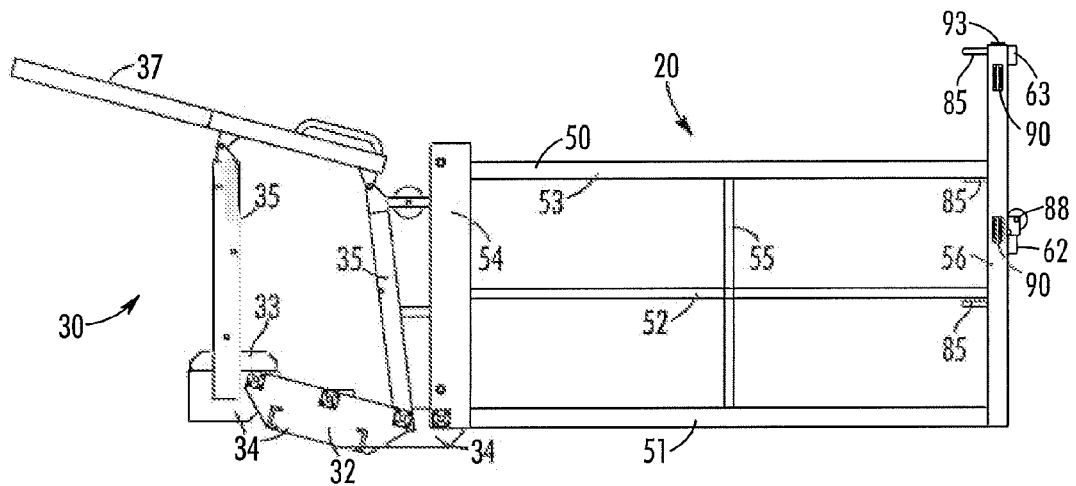
FIG. 4A is a side view of the safety cage and the gangway in the extended loading position.

In order to enhance the safety of workmen who open and close the hatches of the tanker vehicles, a safety cage 20 is provided, which is designed to be placed in encompassing relation to the hatch 17. The safety cage 20 is supported on the free end of a gangway 30. As more fully discussed below, gangway 30 includes an access stairway 33 having steps that may be self leveling and body 34 supporting the stairway 33. Gangway 30 is affixed to platform 12 so that it can be raised to a stored positioned, as shown in FIGS. 3A and 3B, and lowered to an access position, as shown in FIGS. 4A and 4B. Access to tank trucks of differing heights is facilitated by the use of self leveling steps in stairway 33.

As shown in FIG. 1, the access stairway 33 of gangway 30 has been lowered to its safety enhancing position in which the bottom of the safety cage 20 encircles the hatch 17 and rests on the top of the tank 18 of the tank truck 11. In a preferred embodiment, the bottom of the safety cage 20 includes a rubber padding, which reduces scratching and movement between the cage 20 and the tank 18.

Referring to the embodiment shown in FIGS. 2 through 6, the safety cage 20 forms an open-ended quadrilateral shape and is comprised of two opposing upright sides 40 and 50, a joining upright side 60, and a partial pivotable floor 70. Floor 70 is positioned adjacent to the gangway 30. The safety cage 20 is open-ended to allow access from platform floor 13 and gangway 30 to floor 70 of cage 20. To provide additional safety, cage 20 may be only partially opened between gangway 30 and floor 70 of cage 20 or include an entry way that is capable of being closed when a worker is within cage 20.

The first upright side 40 includes a bottom horizontal rail 41, an intermediate horizontal rail 42, and an upper horizontal rail 43. The first upright side 40 also includes a first vertical rail 44 positioned adjacent to the gangway 30, an intermediate vertical rail 45 that intersects the horizontal rails 41, 42, and 43, and a third vertical rail 46 positioned adjacent to joining upright side 60. Bottom horizontal rail 41 is secured to the lower end of the vertical rails 44, 45, and 46, intermediate horizontal rail 42 is secured in approximately the middle of the vertical rails 44, 45, and 46, and upper horizontal rail 43 is secured to the upper end of the vertical rails 44, 45, and 46. The horizontal rails 41, 42, and 43 and vertical rails 44, 45, and 46 are rigidly secured at their respective points of intersection by techniques such as welding or providing bolt-type attachments.

The second upright side 50, which opposes first upright side 40, includes a bottom horizontal rail 51, an intermediate horizontal rail 52, and an upper horizontal rail 53. Similar to the first upright side 40, the second upright side 50 also includes a first vertical rail 54 positioned adjacent to the gangway 30, an intermediate vertical rail 55 that intersects the horizontal rails 51, 52, and 53, and a third vertical rail 56 positioned adjacent to joining upright side 60. Bottom horizontal rail 51 is secured to the lower end of the vertical rails 54, 55, and 56, intermediate horizontal rail 52 is secured in approximately the middle of the vertical rails 54, 55, and 56, and upper horizontal rail 53 is secured to the upper end of the vertical rails 54, 55, and 56. The horizontal rails 51, 52, and 53 and vertical rails 54, 55, and 56 are rigidly secured at their respective points of intersection by techniques such as welding or providing bolt attachments.

The joining upright side 60 includes an intermediate horizontal rail 62 and an upper horizontal rail 63. The ends of horizontal rails 62, 63 are secured to vertical rail 46 of the first upright side 40 and vertical rail 56 of the second upright side 50. In the embodiment shown in FIGS. 3 through 6, vertical rails 46 and 56 are taller than the remaining vertical rails 44, 45, 54, and 55. Upper horizontal rail 63 is positioned between the upper ends of vertical rails 46 and 56 and intermediate horizontal rail 62 is positioned in approximately the middle of vertical rails 46 and 56. Vertical rails 46 and 56 are generally U-shaped with their open ends facing inward towards each other. The horizontal rails 62 and 63 and vertical rails 46 and 56 are rigidly secured at their respective points of intersection on the outer back side of the U-shape of vertical rails 46 and 56 by techniques such as welding or providing bolt attachments.

The joining upright side 60 further includes a gate 80 that vertically slides relative to vertical rails 46 and 56. In the embodiment shown in FIGS. 3 through 6, the gate 80 includes a bottom horizontal member 81, a top horizontal member 84, and two intermediate horizontal members 82 and 83. Each horizontal member has a handle 85 extending inward towards the center of cage 20. Gate 80 also includes a first vertical member 86 positioned adjacent to and within the U-shape of vertical rail 46 and a second vertical member 87 positioned adjacent to and within the U-shape of vertical rail 56. The horizontal members 81, 82, 83, and 84 are positioned between vertical members 86 and 87. Typically, first and second vertical members 86 and 87 are approximately the same height as vertical rails 46 and 56.

Figure 4C:
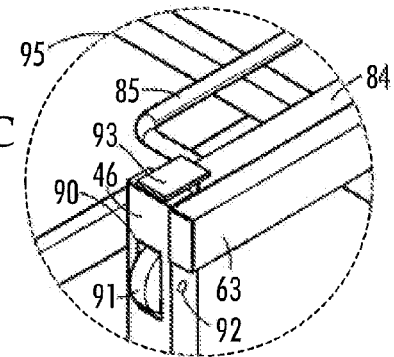
FIG. 4C is a close-up view from FIG. 4B of the roller feature of the safety cage.
Figure 4B:
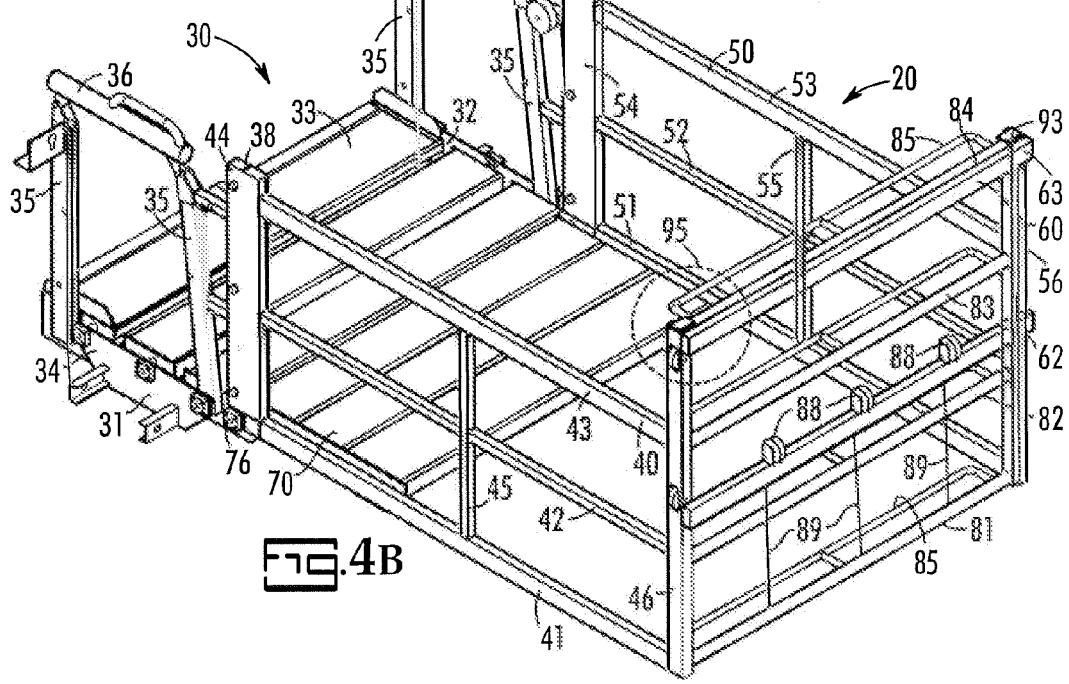
FIG. 4B is a perspective view of the safety cage and the gangway in the extended loading position.

As shown in more detail at 95 in FIGS. 4B & 4C, vertical rails 46 and 56 have cut-out portions 90 along the back side of the respective U-shapes with a roller 91, such as a nylon roller, affixed therein. In the embodiment shown, each rail 46 and 56 includes two cut-out portions 90 and rollers 91. Each roller is positioned and stabilized inside the cut-out portion 90 by pin

Figure 5A:
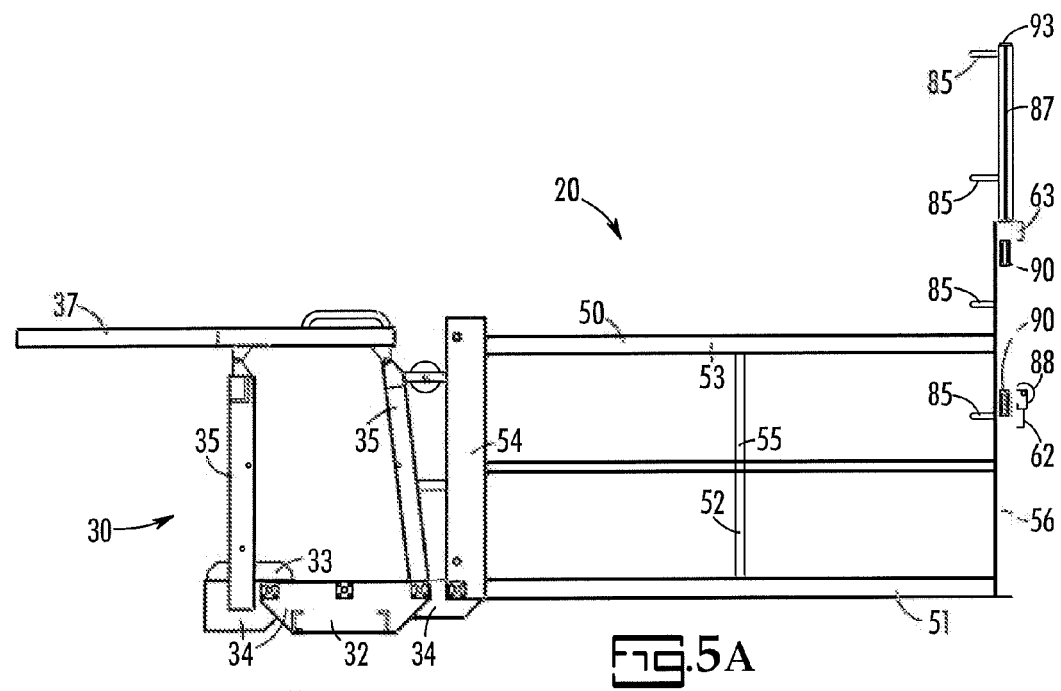
FIG. 5A is a side view of the safety cage and the gangway in the extended loading position with the gate raised.
Figure 5B:
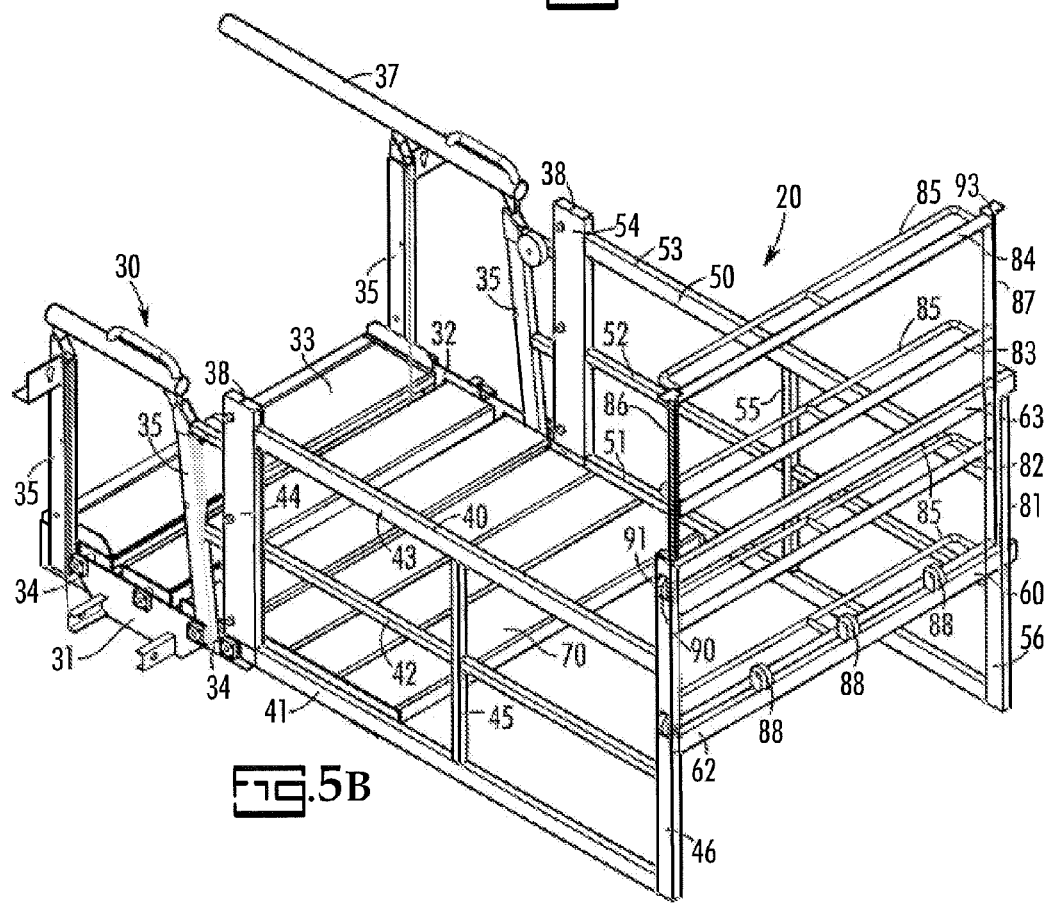
FIG. 5B is a perspective view of the safety cage and the gangway in the extended loading position with the gate raised.

92. The pin 92 is inserted through one lateral side of the U-shape of the respective vertical rail 46, 56, through the roller 91, and then through the opposing lateral side of the respective vertical rail 46, 56. Pin 92 extends parallel with the first and second upright sides so that the roller 91 rotates around an axis that is parallel with the first and second upright sides 40 and 50. Vertical member 86, shown in FIGS. 5A & 5B, is positioned adjacent to the rollers 91 on vertical rail 46 and vertical member 87, also shown in FIGS. 5A & 5B, is positioned adjacent to rollers 91 on vertical rail 56. Gate 80 is held in place and unable to fall away from joining side 60 because of the position of vertical members 86 and 87 within the U-shape of vertical rails 46 and 56. Alternatively, instead of forming a U-shape, vertical rails 46 and 56 have stop members or gate 80 has holding means to restrain gate 80 from falling away from joining side 60. Further, tabs 93 affixed at the upper end of vertical members 86 and 87 and positioned to extend at least partially over a portion of the U-shape of vertical rails 46 and 56 keep gate 80 from sliding below cage 20. Alternatively, stops affixed to the bottom of the U-shape of vertical rails 46 and 56 keep gate 80 from sliding below cage 20.

As shown in FIGS. 5A and 5B, when a worker grasps handle 85 and applies upward force to gate 80, vertical members 86 and 87 slide upward along rollers 91 and within the U-shape of vertical rails 46 and 56. Because joining upright side 60 does not have a bottom horizontal rail, a gap or opening is formed in cage 20 allowing the hatch cover 19 of tank truck 11 to be fully opened so that the top of the hatch cover 19 rests on the upper part of one lateral side of the tank 18 of tank truck 11.

Spring loaded reels 88 may be used to assist movement of gate 80 in the upward direction along rollers 91 and are beneficial in preventing cage 20 from lifting upward due to the upward force and movement of gate 80. In the embodiment shown, three spring loaded reels 88 are affixed to intermediate horizontal rail 62 at approximately equal spacing between vertical rails 46 and 56. As more clearly shown in FIG. 6A, the reels 88 each include cables 89, which extend from the reels to the bottom horizontal member 81 of gate 80. Alternatively, counterweights may be used to assist movement of gate 80.

Figure 2:
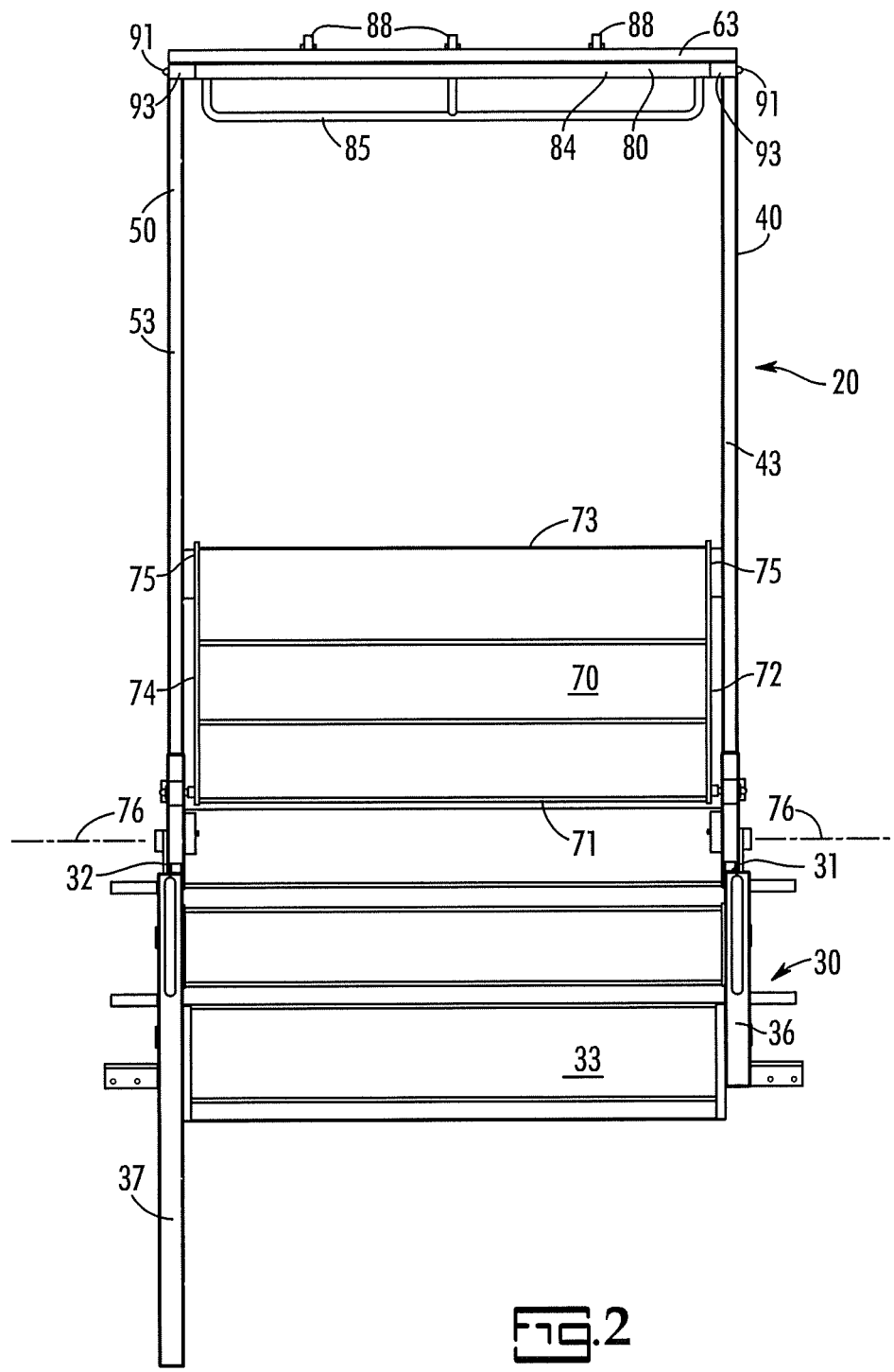
FIG. 2 is a top view of the safety cage and the gangway shown in FIG. 1.
Figure 6A:
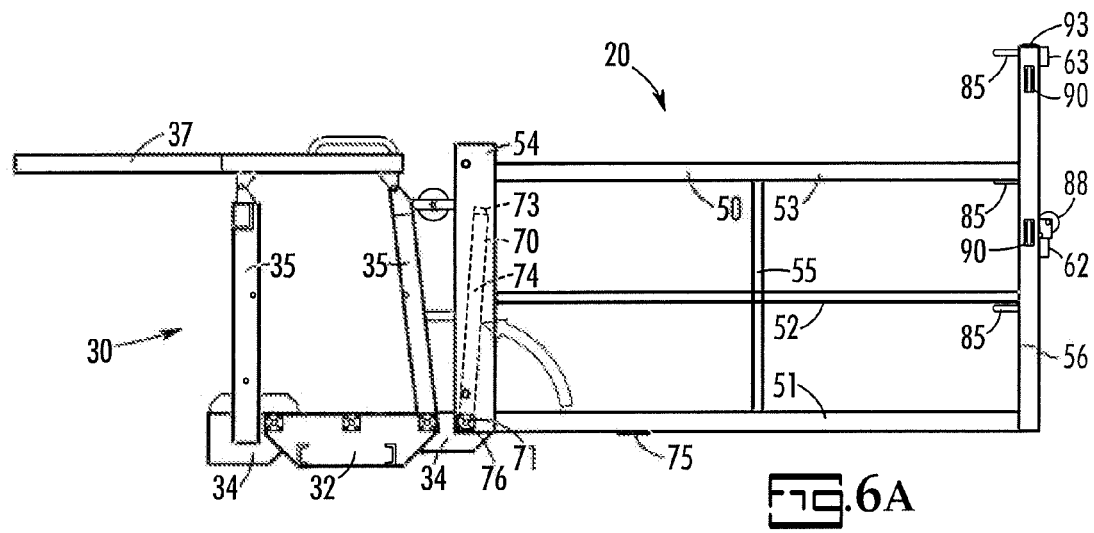
FIG. 6A is a side view of the safety cage and the gangway in the extended loading position with the cage floor pivoted upward.
Figure 6B:
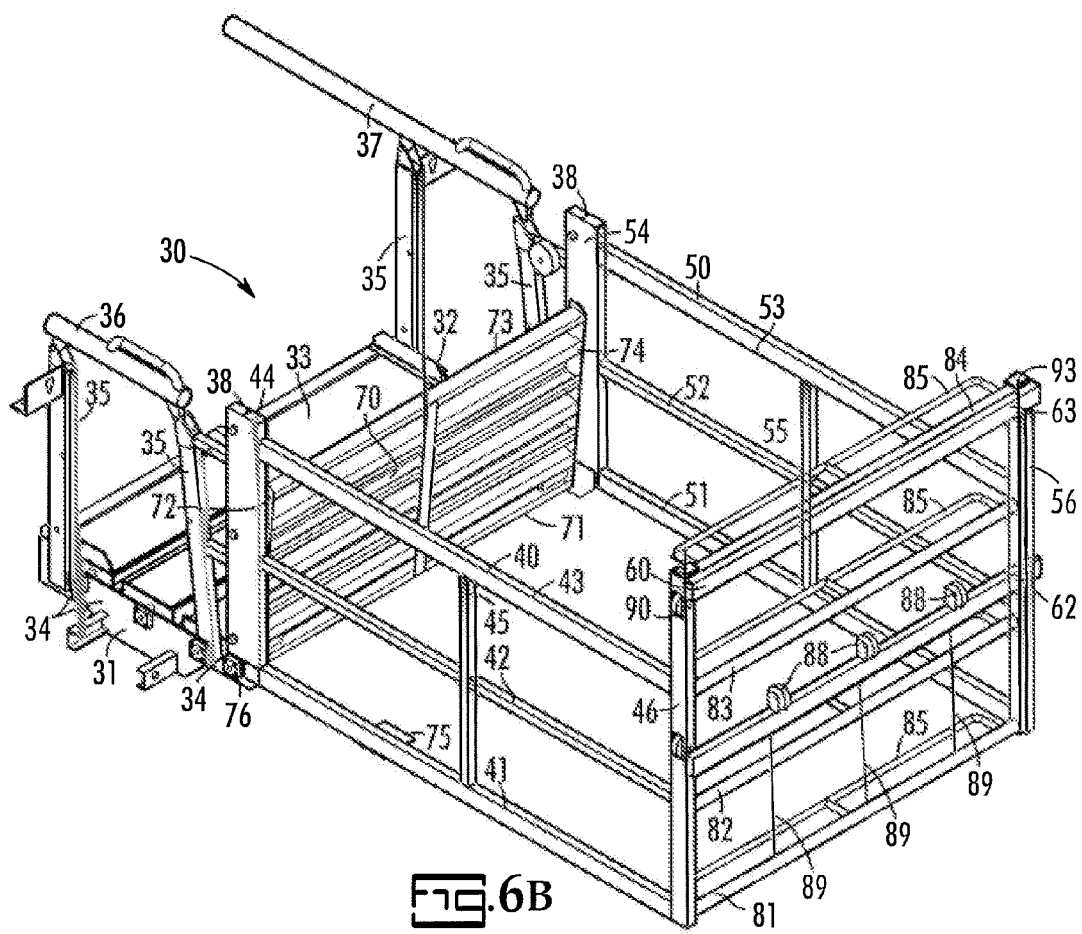
FIG. 6B is a perspective view of the safety cage and the gangway in the extended loading position with the cage floor pivoted upward.

Partial pivotable floor 70 of cage 20 is positioned between the two opposing upright sides 40 and 50 and at the opposing end of cage 20 from joining upright side 60. As shown in FIGS. 2 and 6B, floor 70 is generally quadrilateral in shape and has a first side 71 adjacent to gangway 30, a second side 72 adjacent to upright side 40, a third side 73 opposing first side 71, and a fourth side 74 adjacent to upright side 50.

As more fully shown in FIG. 2, bottom horizontal rails 41 and 51 include stops or tabs 75 that support floor 70 at the intersection of sides 72 and 73 and the intersection of sides 74 and 73. Tabs 75 are typically welded to bottom horizontal rails 41 and 51 but other attachment or forming techniques may be used but must be rigid and secure enough to support the weight of a worker. Floor 70 also includes a pivot axis 76 that runs along first side 71 of floor 70 and connects to first vertical rails 44 and 54 of opposing lateral sides 40 and 50, respectively. As shown in FIGS. 6A and 6B, floor 70 rotates around pivot axis 76. Tabs 75 stop floor 70 from rotating to a position below bottom horizontal rails 41 and 51 of cage 20. Stops may also be located on or approximate to vertical rails 44 and 54 to stop floor 70 from rotating to a position beyond vertical rails 44 and 54.

In the embodiment shown, pivot axis 76 extends through first vertical rail 44, through floor 70 along first side 71, and then through first vertical rail 54. Pivot axis 76 is secured on the outer side of the first vertical rails 44 and 54 using a bolt and nut type assembly, which secures axis 76 to cage 20 but still allows floor 70 to rotate with respect to axis 76.

Figure 7:
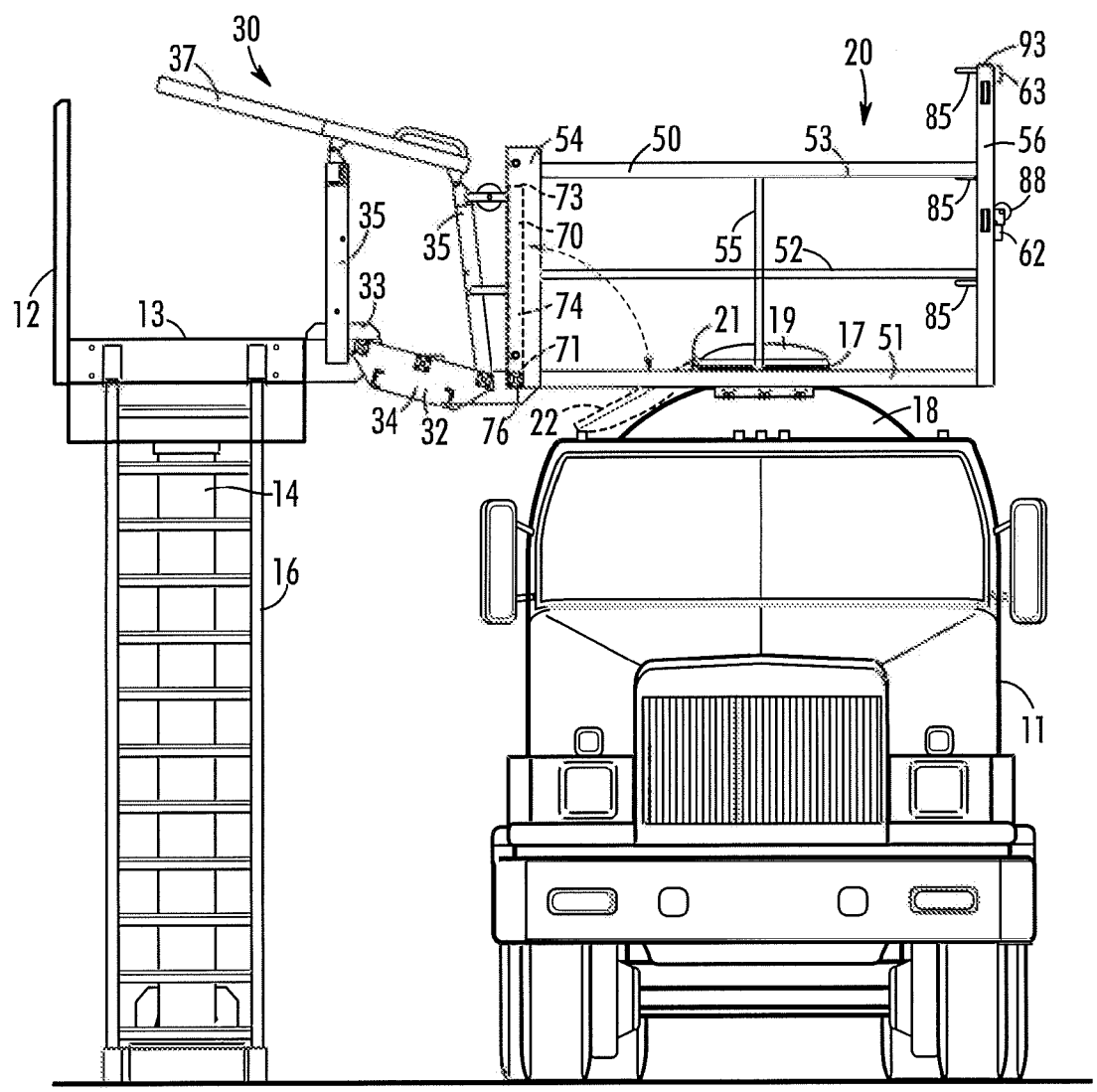
FIG. 7 is a front view of an access platform, the gangway and the safety cage positioned above the hatch of a dry bulk material tank mounted on a truck with the hatch open for loading.

As shown in FIGS. 7, 6A, and 6B, when a worker standing on the upper part of the tank 18 of tank truck 11 applies upward force to floor 70, floor 70 pivots with respect to axis 76 to an upward position. The upward position is shown in FIG. 6B and is also illustrated in FIGS. 6A and 7 by dotted lines. When floor 70 is in the upward position, an opening is formed between cage 20 and hatch 17 of tank 18. The opening is large enough for the hatch cover 19 of hatch 17 to be fully opened so that the top of the hatch cover 19 rests on the upper part of one lateral side of the tank 18 of tank truck 11. After the hatch cover 19 is opened, floor 70 is again lowered to its downward position either resting on tabs 75 or a portion of tank 18, whichever is higher, so that the worker can walk safely back to the gangway 30 and platform floor 13.

As discussed above, gangway 30 includes an access stairway 33 having steps and a body 34 for supporting the stairway 33. Gangway body 34 typically incorporates treads for securing the steps of stairway 33. Gangway 30 also includes vertical posts 35 extending upward and approximately in line with the vertical rails 44, 45, 46 of cage 20 on a first lateral side 31 and vertical posts 35 extending upward and approximately in line with vertical rails 54, 55, 56 of cage 20 on a second lateral side 32. Handrail 36 connects vertical posts 35 on the first lateral side 31 and handrail 37 connects vertical posts 35 on the second lateral side 32 of gangway 30. The handrail of gangway 30 may be extended on one or both sides to block the exit so that a worker is unable to easily access the access or ladder 16 while the gangway is in the down position. In the embodiments shown, handrail 37 is extended.

Figure 8:
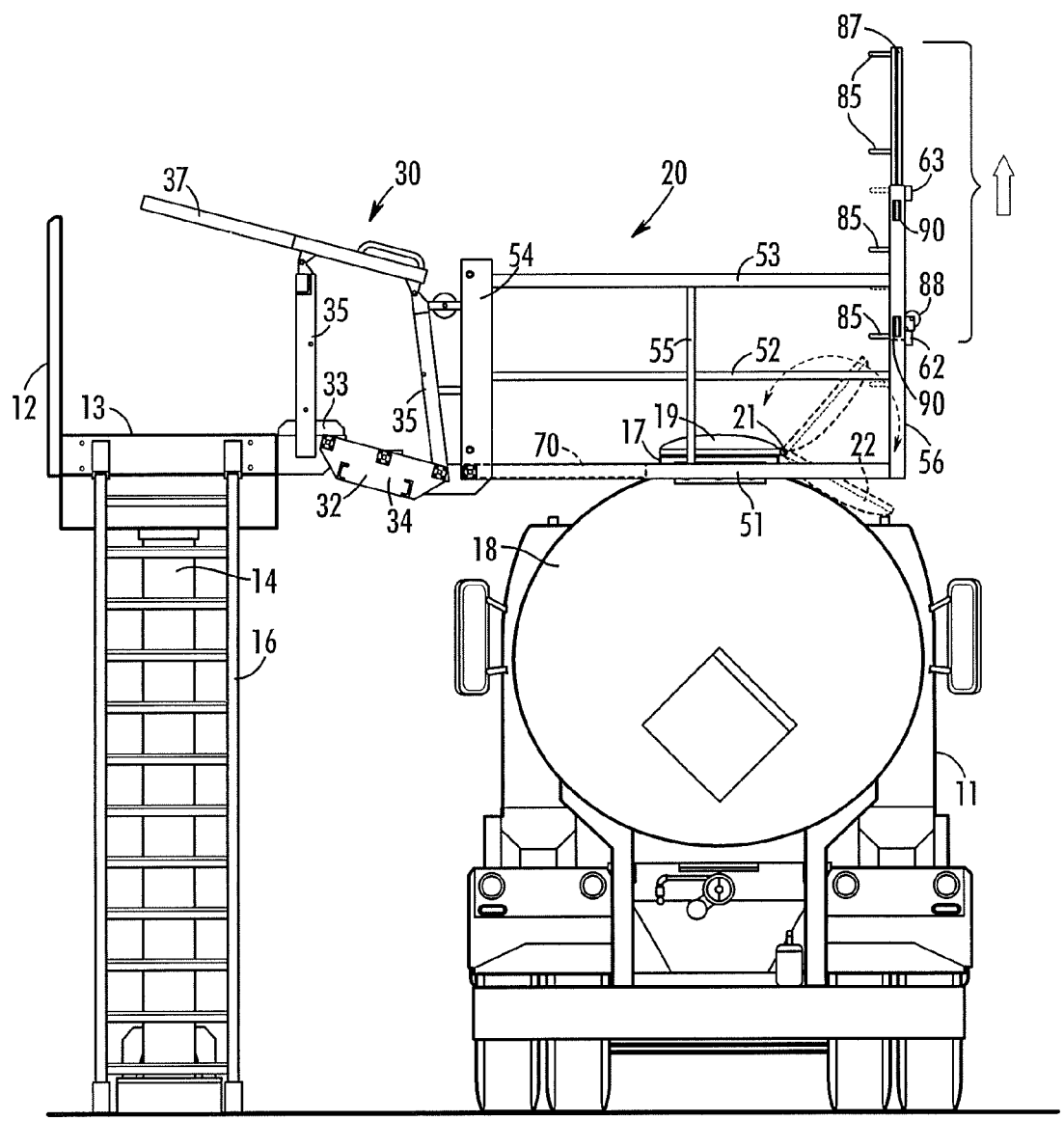
FIG. 8 is a front view of an access platform, the gangway and the safety cage positioned above the hatch of a dry bulk material tank mounted on a truck returning from loading in the opposite direction of FIG. 7 with the hatch open and cage floor raised for closing the hatch.

As discussed above, gangway 30 is connected to platform 12 and is pivotable between a raised stored positioned, as shown in FIGS. 3A and 3B, to a lowered access position, as shown in FIGS. 4A and 4B. Frequently, at least the first and last steps of stairway 33 are self leveling so that the gangway 30 can adjust to varying heights of tank trucks and resting positions of cage 20. For example, as shown in FIG. 1, gangway 30 is positioned parallel with platform 12 and the bottom of cage 20. In contrast, as shown in FIGS. 7 and 8, gangway 30 is positioned at a downward angle with platform 12 and the bottom of cage 20.

Cage 20 is supported on the free end of gangway 30. In the embodiment shown, a portion of body 34 of gangway 30 extends under a portion of cage 20 including first vertical rails 44 and 54 of lateral sides 40 and 50, respectively. Cage 20 is secured to gangway 30 by a bolt 38 extending through the portion of body 34 extending under cage 20 and into first vertical rail 44 of lateral side 40. Cage 20 is also secured to gangway 30 by a bolt 38 extending through the portion of body 34 extending under cage 20 and into first vertical rail 54 of lateral side 50. The portion of body 34 that extends under cage 20 is positioned low enough so that it will not interfere with the pivoting of floor 70 about axis 76. Other securing mechanisms may also be used to secure cage 20 to gangway 30. Furthermore, cage 20 may be secured directly to platform 12 thereby eliminating the need for a gangway.

It should be noted that there are several configurations suitable for the design of cage 20, and the number of vertical and horizontal rails and members discussed above are for example only and represent but one of these configurations. Other configurations altering the number and positions of rails and members could be employed to demonstrate the invention. Further, several configurations suitable for the design of gangway 30 and the number of posts and steps discussed above are for example only and represent but one of these configurations. Other configurations altering the number and position of posts and steps could be employed to demonstrate the invention. All configurations known in the art are intended to be encompassed by the present invention and the description and drawings should not be deemed to narrow the scope of the present invention in any way.

In performing servicing operations, gangway 30 is in its stored position so that safety cage 20 is also in an elevated position. The tank truck 11 is driven beneath the safety cage 20, and the gangway 30 and safety cage 20 are then lowered to the safety enhancing position shown in FIG. 1 wherein the cage rests on the top of tank 18 of tank truck 11. Gangway 30 may be lowered using varying techniques such as by releasing a foot lock on the body of gangway 30 or by pneumatic or hydraulic actuators. Extended handrail 37 blocks the stairs or ladder 16 of the platform 12 so that the worker is hindered from exiting without raising the gangway 30 and cage 20 to the stored position. After the cage is lowered to its safety enhancing position, the worker opens the latches that secure hatch cover 19 to hatch 17. The hatch cover 19, however, is not capable of being pivoted to its fully open position shown in broken lines 22 because of the bottom horizontal member 81 and its corresponding handle 85, which is spaced laterally from the hatch cover a distance less than the width of the hatch cover 19. As shown in FIG. 8, upon applying upward force to gate 80, the worker can then fully open hatch cover 19 by pivoting the hatch cover 19 under extended gate 80. Gate 80 is then released so that it returns to its lowered position and the worker exits the safety cage 20 and returns to platform 12. The gangway 30 and cage 20 are then raised such as by exerting force downward on extended handrail 37 of gangway 30 until the gangway has raised up enough to allow the foot lock to engage or by pneumatic or hydraulic actuators. In the stored position, extended handrail 37 no longer blocks the stairs or ladder 16 of the platform 12 so the worker can easily exit the platform 12. The truck 11 is then driven to a loading station, not shown, to receive bulk material such as cement.

Alternatively, if the tank truck 11 approaches the service station in the opposite direction or hatch cover 19 was pivotally hinged to hatch 17 on a horizontal axis on the opposing side of hatch 17 to horizontal axis 21 (such as shown in FIG. 7), the hatch cover 19 would not be capable of being pivoted to its open position because of floor 70, which is spaced laterally from the hatch cover a distance less than the width of the hatch cover 19. However, the hatch cover 19 can be opened by applying upward force to floor 70, which causes floor 70 to pivot with respect to axis 76 to the upright position depicted by dotted lines in FIG. 7. After the hatch cover 19 is fully opened, floor 70 can be released so that it returns to its downward position either resting on tabs 75 or a portion of tank 18, and the worker can exit the safety cage 20 and return to platform 12. The gangway 30 and cage 20 are then raised, and the truck 11 is driven to a loading station, not shown, to receive bulk material such as cement.

After material has been loaded, tank truck 11 is then driven back to the servicing station where a worker closes the hatch cover 19. The hatch cover 19 is closed using the same techniques discussed above. The technique used, pivoting of the floor 70 or lifting of gate 80, depends on the direction that the tank truck 11 approaches the service station and which side the hatch cover 19 is hinged to the hatch 17.

Optionally, gates and/or floor panels may also be added to other sides of cage 20. For example, if the hatch cover 19 opens on a horizontal axis perpendicular to axis 21 and extending in the lateral direction of the vehicle, upright sides 40 and/or 50 may be configured to include a gate similar to gate 80 and the bottom horizontal rail 41 and 51, respectively, would be at least partially removed or positioned so that it does not interfere with hatch cover 19. Alternatively, upright sides 40 and/or 50 may be configured to include a floor panel similar to the configuration of floor 70 with a pivoting axis.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above described exemplary embodiments.

In addition, it should be understood that the figures, which highlight the functionality and advantages of the present invention, are presented for purposes of example only. The architecture of the present invention is sufficiently flexible and configurable, such that it may be used in ways other than that shown in the accompanying figures.

Further, the purpose of the Abstract of the Disclosure is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The Abstract of the Disclosure is not intended to be limiting as to the scope of the invention in any way.

What is claimed is:

1. An apparatus for providing safe access to a top of a mobile container, said mobile container having a hatch cover positioned at the top of said mobile container, said hatch cover pivots between an open and a closed position, said apparatus comprising:
   a gangway capable of being raised and lowered;
   a cage having a first end attached to said gangway and an opposing second end, said cage comprising a first lateral side, a second lateral side, and a joining side for joining said first and second lateral sides at said opposing second end of said cage; said first lateral side and said second lateral side each having horizontally extending rails, said joining side comprising a first horizontal rail, a second horizontal rail, a first vertical rail, and a second vertical rail, said first and second horizontal rails of said joining side connected to said first and second vertical rails of said joining side; and
   a slidable gate positioned directly adjacent to said joining side and within said cage, said gate is vertically slidably engaged with said first and second vertical rails of said joining side inward of said first and second horizontal rails of said joining side; said gate includes a handle extending inward towards the center of said cage, said handle is accessible from the inside of said cage;
   wherein said gate slides entirely within said cage.

2. The apparatus of claim 1 wherein said gate further comprises an upper surface having tabs, said tabs engaging said cage to prevent said gate from sliding below said cage.

3. The apparatus of claim 1 wherein said first lateral side of said cage comprises a first horizontal rail, a second horizontal rail, and a third horizontal rail, said first lateral side also comprises a first vertical rail and a second vertical rail, said first vertical rail of said first lateral side affixed to said gangway.

4. The apparatus of claim 3 wherein said second lateral side of said cage comprises a first horizontal rail, a second horizontal rail, and a third horizontal rail, said second lateral side also comprises a first vertical rail and a second vertical rail, said first vertical rail of said second lateral side affixed to said gangway.

5. The apparatus of claim 4 wherein said gate is slideably engaged with said first and second vertical rails of said joining side by rollers affixed to said first and second vertical rails of said joining side.

6. The apparatus of claim 1 wherein said gate is slideably engaged with said first and second vertical rails of said joining side by rollers affixed to said first and second vertical rails of said joining side and wherein said gate includes spring loaded reels for assisting movement of said gate.

7. The apparatus of claim 1 further comprising an elevated platform wherein said gangway is attached to said platform.

8. The apparatus of claim 7, wherein said gangway comprises a gangway body, posts extending vertically above said gangway body, and a handrail attached to said posts.

9. The apparatus of claim 8 wherein said gangway is raised and lowered with said handrail and said platform comprises an access way having steps, said handrail hinders access between said elevated platform and said access way when said gangway is lowered.

10. The apparatus of claim 1 wherein said cage further comprises a partial floor adjoining said first and second lateral sides at said first end.

11. An apparatus for providing safe access to a top of a mobile container, said mobile container having a hatch cover positioned at the top of said mobile container, said hatch cover pivots between an open and a closed position, said apparatus comprising:
  a gangway capable of being raised and lowered; and
  a cage having an open bottom, a first end attached to said gangway, and an opposing second end, said cage comprising a first lateral side, a second lateral side, a joining side for joining said first and second lateral sides at said opposing second end of said cage, and a partial floor adjoining said first and second lateral sides at said first end, said partial floor dimensioned to extend less than half the length of said first lateral side of said cage;
  wherein said partial floor includes a pivot axis rod and pivots about said pivot axis rod, said pivot axis rod extends parallel with said first end of said cage;
  wherein said pivot axis rod extends through said first lateral side, said partial floor, and said second lateral side and beyond said first lateral side and said second lateral side, said pivot axis rod is secured to said first lateral side at a first pivot axis rod end and to said second lateral side at a second opposing pivot axis rod end, further comprising an elevated platform wherein said gangway is attached to said platform, wherein said gangway comprises a gangway body and a handrail attached to said gangway, wherein said gangway is raised and lowered with said handrail and said platform comprises an access way having steps, said handrail hinders access between said elevated platform and said access way when said gangway is lowered.

12. The apparatus of claim 11 wherein said gangway comprises a body and an access, said body supports said access and said access includes a self leveling step.

13. The apparatus of claim 11 wherein said first lateral side of said cage comprises a first horizontal rail, a second horizontal rail, and a third horizontal rail, said first lateral side also comprises a first vertical rail, a second vertical rail, and a third vertical rail, said first vertical rail of said first lateral side affixed to said gangway and connected to said first pivot axis rod end of said pivot axis rod.

14. The apparatus of claim 13 wherein said second lateral side of said cage comprises a first horizontal rail, a second horizontal rail, and a third horizontal rail, said second lateral side also comprises a first vertical rail, a second vertical rail, and a third vertical rail, said first vertical rail of said second lateral side affixed to said gangway and connected to said second opposing pivot axis rod end of said pivot axis rod.

15. The apparatus of claim 14 wherein said joining side comprises a first horizontal rail and a second horizontal rail, said first and second horizontal rails connected to said third vertical rail of said first lateral side and said third vertical rail of said second lateral side.

\* \* \* \* \*